Patented Feb. 23, 1932

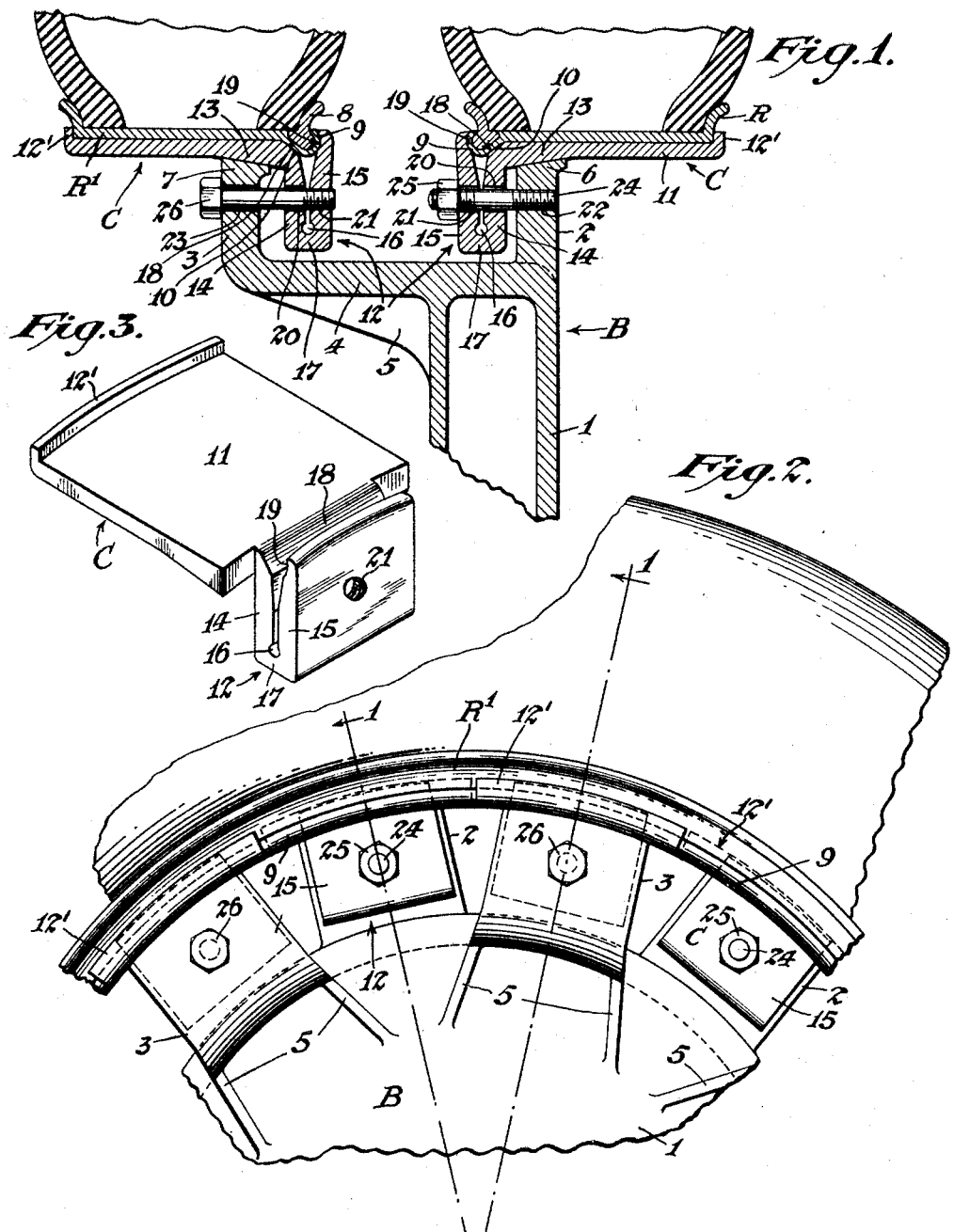

1,846,064

UNITED STATES PATENT OFFICE

WILLIAM NELSON, OF MINNEAPOLIS, MINNESOTA, ASSIGNOR TO BURNETT WALKER, OF NEW YORK, N. Y.

WHEEL STRUCTURE

Application filed May 3, 1928, Serial No. 274,756. Renewed July 15, 1931.

The invention relates to dual-tire wheels, usually of automobile type, and also usually of metal, and has for its principal object the provision of inner and outer rim-supports on the wheel body, of which the outer supports are located at such distances from the wheel center as to permit an inward tire rim of standard type, which usually has an inwardly-projecting annular bead or bevel formation, to be passed over or about them, together with clamps, or combined spacers and clamps of simple character, which are readily applicable to the outer rim supports and outer rim, to properly center, reinforce and secure the same upon the wheel.

The inner rim-supports may be, and desirably are, for the sake of uniformity and standardization, dimensioned or radially located similarly to the outer supports, and in such case similar spacer-clamps are provided for the inner supports and rim; otherwise in some cases the arrangement of the inner supports might be such as to permit the inner rim to be mounted directly on them and secured by ordinary clamps or clips.

The characteristics and advantages of the invention are further sufficiently explained in connection with the following detail description of the accompanying drawings, which show one representative embodiment. After considering this example, skilled persons will understand that many variations may be made without departing from the principles disclosed, and I contemplate the employement of any structures that are properly within the scope of the appended claims.

In the drawings:

Fig. 1 is a fragmentary section, in an axial plane, of a wheel embodying the invention in one form.

Fig. 2 is a partial side elevation.

Fig. 3 is a perspective view of a spacer-clamp.

The wheel body B includes an inner portion 1 which may be of hollow, or annular box form. This inner or central portion of the body carries supports for an inner and an outer rim R and R¹ respectively. These supports are in the specific form chosen for illustration, an inner series of short radial spokes 2 and an outer series of similar spokes 3 formed at the inner and outer edge of a horizontal flange 4 and suitably braced by ribs 5. The ends of spokes 2 have tapered or segmental conical rim-supporting formations 6, and spokes 3 have rim supporting formations 7 which are desirably similar to the formations 6 in respect to radial distance from the wheel center; but the respective formations or conical segments are in relatively reversed relation; that is, the taper of the inner supports is directed outward and the taper of the outward supports is directed inward, the particular arrangement being largely for the purpose of what may conveniently be called "edge-mounting" of the respective rims. This manner of mounting is sufficiently explained in the drawings and provides for practically uniform spacing of the adjacent sides of the tires regardless of reasonable variations in tire cross-sectional diameter.

The rims R and R¹ are of one known or standard type, and these and other practical demountable rims are designed to detachably retain the tire shoe by means of a split ring or similar device, such as a retaining ring of one standard type being indicated at 8. The use of such a tire retainer necessitates an annular socket formation in the rim such as 9, this being in the nature of an annular inwardly projecting bead, and usually also having a beveled face such as 10 to cooperate with a complemental part of the felly of an ordinary wheel body to which the rim is secured by clips and bolts or nuts.

A special problem is involved in dual wheels in providing for the mounting thereon of two such standard rims, because the inwardly projecting bead of the inwardly located rim must pass over the outer rim supporting formations of the wheel, and this in turn requires some special provision for the proper spacing or mounting of the outwardly located rim upon its supports, which for the reason just stated are located radially inwardly from the inner periphery of the rim. The inner rim supports may be made to engage directly with the rim, but for the sake of uniformity and standardization both as to structure and method of applying and removing the rims, it is usually preferred to make the inner rim support substantially like the outer support except for relative reversal of position, and such a structure is illustrated in the drawings. Such an arrangement provides, for example, for complete uniformity or standardization of the tire equipment of a vehicle; that is, tires of the same dimensions and mounted on rims of the same dimensions may be provided for all the wheels, a single tire usually being mounted on each front wheel and two tires on the rear wheels, for heavy bus and truck service. The front wheel may, therefore, have a rim supporting structure similar to that illustrated for the present dual wheel; otherwise the front wheel rim supports may be of any other ordinary, known or suitable type.

To properly center, support, and clamp the rims upon the supporting formations 6 and 7, spacer-clamps C are provided, each of which includes a rim-base or spacer portion 11 and a clamp 12. Portion 11 has the general form of a cylindrical segment with a true cylindrical outer face to engage the inner surface of the rim. Desirably the base member has at its end remote from the clamp, a lip or flange 12' to engage one edge of the tire rim. The under surface of the base or spacer adjacent the clamp is formed as a tapered or conical segment 13 to cooperate with one of the spoke surfaces 6 or 7. The clamp includes parallel members 14 and 15 of which the part 15 may be hingedly connected to 14, although this is unnecessary, and preferably the clamp structure is integral with the base 11. Flexible movement of the outer clamp jaw 15 is provided by suitable dimensioning of the two jaws at their intersection, as, for example, by providing a part-cylindrical aperture 16 to secured reduced wall thickness and resilience of the connecting member 17. The base 11, or the upper part of the clamp member 14 adjacent the base, is formed with a tapered or segmental conical surface 18 to cooperate with the beveled or conical rim formation 10. The upper end of clamp jaw 15 is adapted to cooperate with the outer face of the rim bead 9, and desirably the jaw has near its upper edge a shallow arcuate groove or channel 19 to embrace the rounded outer conformation of the bead 9.

Aligned holes 20 and 21 are bored through the jaw members 14 and 15 respectively, to correspond with the location of holes 22 and 23 in spokes 2 and 3 respectively, these holes being designed to receive clamping screws or bolts. Thus in one preferred arrangement, the holes 22 are threaded and stud bolts 24 are fixedly inserted in these holes. To cooperate with these stud bolts, holes 20 and 21 through the clamp members for the inner rim are not threaded, but have clearance about the bolt; and clamping action is provided by a nut 25 applied to the outer threaded portion of the bolt after the clamp is positioned thereover. The clamping arrangement for the outer rim clamps includes screws 26 inserted freely through the holes 23 in the outer spokes and engaging threads formed in the holes 21 of clamp members 15. Screws such as 26 may be substituted for the bolt and nut arrangement for operating the inner rim clamps, the ends of the screws in this case engaging the threaded holes 22 of the inner spokes.

Fig. 1 is a composite section, for convenience of illustration, the section plane for each spoke being taken through the spoke center, as explained by the dot-and-dash line 1—1—1, Fig. 2; but actually the inner and outer spokes are in relatively staggered or interspaced relation, as clearly shown in Fig. 2.

The inner rim R is applied to the wheel when the outer spokes are free of clamps. The rim is thus easily passed over the ends of spokes 3, and the inward cylindrical portion 11 of the rim is lapped somewhat over the ends of the inner spokes 2. The inner clamps C are then introduced between the outer spokes and moved to positions directly behind the outer spokes (as viewed in Fig. 2) and are then properly located on rim R, after which the rim and clamps are rotated in relation to the wheel body to bring the holes of the clamping members opposite the ends of the stud bolts, or if screws are used, opposite holes 22 of spokes 2, whereupon the tapered or conical faces 13 of the rim are opposite or partially overlapping the outer portions of the supporting formations 6 on the spoke ends. The rim is then moved inward to effect approximately tight engagement of the respective conical surfaces, after which nuts 25 are applied, or the screws are inserted and tightened. The tightening of the nuts or screws has the combined results of clamping the rim bead formation between the ends of the outer jaw 15 and the beveled or conical surfaces 10, the forcing of the clamps inward with tight engagement between the surfaces 6 and 13, and the forcing of the entire rim inward and contact of its inner edge with the clamp flanges 12. The rim is thus securely clamped to the inner spokes in over-hanging relation thereto. The outer rim is then located about the ends of spokes 3, the outer clamps are inserted between the spokes and applied to the rim, after which the rim and clamps are rotated sufficiently to properly locate the clamps over the outer ends of the spokes, the screws 26 are inserted and tightened, and the outer rim is thus locked upon the wheel in the same manner as described with relation to the inner rim.

Demountable rims of this class are usually of relatively thin section and usually require additional support, which in single-tire wheels is usually provided by a continuous wheel felly. In the present invention sufficient support for the rims is provided by the clamp base portions 11, which, as explained in Figs. 2 and 3, may be of substantial length in the circumferential direction, and these bases may even be so long that they occupy practically the entire circumference of the rim and amply stiffen or reinforce it.

I claim:

1. In combination with a wheel body having a generally conical clamp supporting surface and a demountable rim of generally cylindrical form and having an annular bead formation on one margin, a clamp comprising a plate portion engaging the inner rim surface and having an inner conical formation cooperating with the wheel body cone surface, the clamp also having integral, relatively yieldable jaw formations adapted to grip the rim bead formation at opposite sides thereof, and bolts engaging the wheel body and one of the clamp jaw members to tighten the clamp plate between the wheel body and rim and simultaneously engage the jaw members with the rim bead.

2. In combination with a wheel body having a generally conical clamp supporting surface and a demountable rim of generally cylindrical form and having an annular bead formation on one margin, a clamp comprising a plate portion located between the wheel body and rim and forming the sole support of the rim adjacent the clamp, said plate portion engaging the inner rim surface and having an inner conical formation cooperating with the wheel body cone surface, the clamp also having integral, relatively yieldable jaw formations adapted to grip the rim bead formation at opposite sides thereof, and bolts engaging the wheel body and one of the clamp jaw members to tighten the clamp plate between the wheel body and rim and simultaneously engage the jaw members with the rim bead.

3. In combination with a wheel body having a generally conical clamp supporting surface and a demountable rim of generally cylindrical form and having an annular bead formation on one margin, a clamp comprising a plate portion engaging the inner rim surface and having an inner conical formation cooperating with the wheel body cone surface, the clamp also having integral, relatively yieldable jaw formations adapted to grip the rim bead formation at opposite sides thereof, and bolts engaging the wheel body and one of the clamp jaw members to tighten the clamp plate between the wheel body and rim and simultaneously engage the jaw members with the rim bead, the clamp plate also having at its end away from the gripping jaws a flange engaging outside the adjacent rim edge.

4. The combination of a wheel body having spaced, substantially conical clamp supporting surfaces, a demountable rim having a substantially cylindrical inner surface with an inwardly projecting bead on one side thereof, and a plurality of clamps, each including a plate portion located between one of the conical wheel surfaces and the rim and constituting the sole rim support adjacent said surface, and gripping jaws extending radially inward, the jaws being integrally and resiliently connected at their inner ends and having their outward portions formed to grip the rim bead at opposite sides thereof, and bolts engaging in the wheel body and also engaging one of said jaws to produce gripping action on the rim bead and simultaneous tightening of the clamp in relation to the wheel surface and rim.

In testimony whereof I affix my signature.

WILLIAM NELSON.